3,575,876
WET PROCESS FOR PREPARING ANTIMONY ACTIVATED ALKALINE EARTH METAL HALOPHOSPHATE PHOSPHORS
Roger D. Piper, Des Peres, Mo., assignor to Mallinckrodt Chemical Works, St. Louis, Mo.
No Drawing. Continuation of application Ser. No. 646,493, June 16, 1967. This application Feb. 6, 1970, Ser. No. 7,408
Int. Cl. C09k 1/36
U.S. Cl. 252—301.4
3 Claims

ABSTRACT OF THE DISCLOSURE

Apatite-type fluorescent compositions are prepared by first precipitating an alkaline earth halophosphate intermediate that is deficient in antimony activator, then digesting the intermediate in a solution containing the antimony activator ions. A brief firing develops the fluorescent capacity to the conventional range.

CROSS-REFERENCE TO RELATED APPLICATION

This application is a continuation of application Ser. No. 646, 493, filed June 16, 1967 and now abandoned.

BACKGROUND OF THE INVENTION

The present invention relates to the field of inorganic chemistry, and more particularly to processes of preparing activated bivalent metal halophosphates by precipitation.

It is well known that activated halophosphates of bivalent metals are widely used as the luminescent coating material in the familiar fluorescent electric lamps. The nature and composition of such halophosphate phosphors are adequately described in the patent and journal literature. Representtaive of these is the disclosure of A. H. McKeag and P. W. Ranby in U.S. Pat. 2,488,733, granted Nov. 22, 1949. As indicated therein, these halophosphate phosphors are more or less analogous to the naturally occurring mineral, apatite.

Many embodiments of apatite-type halophosphate phosphors are known. These consist basically of a matrix containing various supplementary modifier and activator ions, usually in minor amounts. One of the most widely employed basic matrices is a calcium fluorophosphate represented by the formula $3Ca_3(PO_4)_2 \cdot CaF_2$. This formula corresponds to that of natural apatite. The inclusion of a small proportion of trivalent antimony ions in the crystal lattice of the apatite matrix provides a phosphor that is excited by ultraviolet radiation of 2537 A. wavelength to fluoresce with the emission of a pale blue light. By modifying this basic antimony-activated calcium fluorophosphate phosphor one may bring about qualitative and quantitative changes in the character of the light emitted by the phosphor. It is well known, for example, that manganese is a desirable secondary or supplementary activator. Similarly, it is known that the substitution of strontium and/or cadmium for a portion of the calcium and of chloride for a portion of the fluoride in the basic matrix modifies the characteristics of the phosphor in a manner that may be desirable for certain purposes. The effects of such variations are discussed, for example, by McKeag and Ranby referred to above, by G. R. Gilooly, et al., U.S. Pat. 3,109,819, Nov. 5, 1963, and by M. A. Aia et al., U.S. Pat. 2,965,786, Dec. 20, 1960.

In the conventional method of preparing such phosphors, suitable highly purified and finely powdered source compounds are mixed thoroughly and the mixture is fired at a high temperature for an extended period to bring about vapor-solid and/or solid state reactions among the ingredients, with the formation of a crystal-line product having the apatite structure. Typically, a mixture of calcium monohydrogen phosphate ($CaHPO_4$), strontium monohydrogen phosphate ($SrHPO_4$), calcium chloride and/or calcium fluoride, antimony trioxide, ammonium chloride and maganese phosphate or manganese carbonate is ball-milled to achieve intimate mixing and the mixture is fired at 1050–1200° C. for two or more hours.

For some time it has been suspected by those skilled in the phosphor art that the microstructure of halophosphate phosphors prepared by the conventional dry-firing process was non-uniform. Such non-uniformity is believed to be an important defect in phosphors prepared by conventional methods, since the presence of core portions deficient in the requisite activators, for example, reduces the light output that might otherwise be achieved.

Some attempts have been made at using wet methods in the preparation of halophosphate phosphors, but these have not avoided the fundamental weakness of the conventional method, i.e., the necessity for a high temperature solid state diffusion-controlled process. Such approaches are described, for example, in U.S. Pat. 2,476,654, July 19, 1949, and Netherlands Pat. 83,992, Dec. 16, 1956.

Recently, D. J. Frese, R. S. Schreiber and H. C. Bertsch (coassigned U.S. patent application Ser. No. 610,772, filed Jan. 23, 1967, now abandoned, and coassigned, copending U.S. continuation patent application Ser. No. 9,103, filed Feb. 9, 1970) developed an improved precipitation method for the preparation of halophosphate phosphors. This process involves mixing at least two aqueous reactant solutions containing phosphate, fluoride and activator ions and the bivalent metal ions desired in forming the matrix of the phosphor, the reactant solutions being complete, that is, substantially free of undissolved matter. The immediate product of this process fluoresces under U.V. light and is converted by a brief firing step to an apatite-type phosphor of fluorescent output comparable to that of phosphors made by the conventional method.

One problem associated with the Frese et al. process is that it is difficult to keep the antimony from precipitating prematurely in the feed solution tank unless the solution is maintained at a rather high level of acidity. It is well known that antimony salts hydrolyze rather readily to form slightly soluble basic compounds. Since it is desirable to carry out the precipitation of the halophosphate slowly, this means that the antimony feed solution will normally be held in the feed solution tank for a period of perhaps several hours. At moderate levels of acidity, the antimony is likely to begin to precipitate hydrolytically in the feed tank before the precipitation of the halophosphate is complete.

SUMMARY OF THE INVENTION

Among the objects of the present invention may be mentioned the provision of improved methods of preparing activated bivalent metal halophosphate compounds, especially the provision of improved methods of preparing such compounds by precipitation. Other objects and features will be in part apparent and in part pointed out hereinafter.

The present invention is directed to a process for preparing an apatite-type fluorescent composition from a plurality of solutions, the summation of which contain phosphate, fluoride, activator and bivalent matrix metal ions as the essential components of the desired apatite-type fluorescent composition, which comprises interreacting a first solution containing solutes selected from the group consisting of salts of bivalent matrix metals alone and a combination of salts of bivalent matrix metals and salts of activator metals, with a second solution of ions selected from the group consisting of phosphate and fluoride ions to form an intermediate precipitate, the summation of said first and second solutions being deficient in at least one of said essential components, and thereafter exposing said intermediate precipitate to a third solution containing said deficient component or components selected from the group consisting of fluoride, phosphate and activator ions and thereby forming an apatite-type fluorescent composition. The invention is also directed to the unfired and fired apatite-type fluorescent compositions produced through the practice of the invention.

This process provides an alternative method of incorporating activator ions into halophosphate compositions prepared by precipitation thus making it possible to add the solution containing the activator ions rapidly, even though the principal precipitation is carried out over an extended time. This is of particular advantage in the incorporation of antimony and other ions which may be difficult to hold in solution in the feed tank over extended periods. It also adds considerable flexibility to precipitation processes for preparing apatite-type phosphors. For example, a series of phosphors differing only in the activators present may be made using a single set of stock solutions to form the basic matrix, different activators being added to slurries of the intermediate precipitate.

DESCRIPTION OF THE PREFERRED EMBODIMENTS

Many embodiments of the invention are possible. For example, if the desired phosphor is an antimony-activated calcium fluorochlorophosphate, as a first step a solution of calcium chloride may be reacted with a solution containing phosphate and fluoride ions in approximately the stoichiometric proportions desired in the final phosphor. The usual precautions should be observed to exclude ions whose presence in the final phosphor would be undesirable and which would not be reduced to innocuous levels in the fired phosphor in the normal course of processing, as by washing or leaching in the wet steps of the process or by volatilization in the firing step. Preferably, one of the reactant solutions is somewhat acidic and the other somewhat basic. Ordinarily, the two reactant solutions are added simultaneously to a third reaction vessel containing water as a reaction medium. The solutions are preferably added at stoichiometrically equivalent rates with good stirring. Ordinarily the reaction mixture will be maintained approximately neutral, that is within the pH range of about 6–8. However wider variations are often acceptable, depending on the specific circumstances.

In the case under consideration, following the precipitation of the calcium halophosphate matrix the antimony activator is added, conveniently as a solution of antimony trichloride, to the precipitation slurry. The activator is rapidly incorporated into the calcium halophosphate matrix and the resulting product then may be promptly filtered off, washed and dried. The dried product has the apatite-crystal structure as indicated by X-ray diffraction and it fluoresces under short wave U.V. (2537 A.) radiation.

Firing for a relatively brief period at about 1050° C. brings about full development of the fluorescent capacity to a level comparable with that of commercial phosphors of the same general type.

In another variation the antimony activator may be included in the same solution as the calcium ions, and fluoride may be omitted from the phosphate solution. The fluoride may then be incorporated after formation of an intermediate calcium chlorophosphate:Sb precipitate to form the desired antimony-activated calcium fluorochlorophosphate.

In another variation, an intermediate calcium phosphate precipitate is formed by interreaction of solutions of calcium and phosphate salts, after which solutions of antimony (III) and fluoride ions are added to the slurry of the intermediate precipitate to form the desired apatite-type phosphor.

In still another variation, solutions of calcium and fluoride ions are first interreacted to form an intermediate calcium fluoride slurry, to which is added solutions containing the antimony and phosphate ions to complete the formation of the antimony-activated calcium halophosphate.

Still further variations are possible. For example, if it is desired to replace a portion of the calcium in the antimony-activated calcium halophosphate with strontium and/or cadmium, these components may be included in the original solution with the calcium ions, and thus precipitated in the first step, or they may later be incorporated by means of the treatment of the intermediate precipitate.

Similarly, if the presence of manganese as a supplementary activator is desired, it may be incorporated at the same time as the antimony, or either may be included in the intermediate precipitate and the other incorporated by means of the post-precipitation treatment.

It will be understood that chloride is normally desired in the halophosphate matrix. However, if chloride is not desired, other water-soluble bivalent metal compounds such as nitrates, acetates, bromides and iodides may be employed. Similarly, other bivalent metals, such as barium, zinc, magnesium or the like, may be included, if desired, in place of or in addition to those mentioned previously.

The following examples further illustrate the invention:

EXAMPLES 1–4.—MAKE-UP

Solution A (cation solution)

A clear acidic solution was prepared by dissolving acid soluble compounds of selected metals in dilute hydrochloric acid and diluting the resulting clear solution with water to a total volume of one liter.

Solution B (anion solution)

Diammonium hydrogen phosphate and ammonium fluoride were dissolved in dilute ammonia solution and the resulting solution was diluted with water to a total volume of two liters.

Components used in making up Solutions A and B are set forth in Table 1.

Precipitation

Solutions A and B were simultaneously added, at rates of approximately 100 ml./min. and 200 ml./min., respectively, into a precipitation vessel containing about 500 ml. of water, well stirred. At the end of the precipitation the precipitation slurry was neutral to slightly alkaline (pH 7–8).

Post precipitation treatment

In Examples 1 and 4, following completion of the precipitation the slurry was divided into two equal portions (X and Y) for further treatment. Except as indicated, Mn (II) and/or Sb (III) were added, as activators, to the well stirred slurry. The Mn (II) was added as an approximately 58% solution of $Mn(NO_3)_2$ and the Sb (III) was added as a solution of $SbCl_3$ made by dissolving $Sb_2O_3$ in a solution of hydrochloric acid and ammonium chloride. Except as indicated, following addition of the activator solutions the resulting mixture was filtered with reasonable promptness. The precipitate was then washed, dried at 125° C. and ground to pass a 140 mesh screen.

Details are set forth in Table 2.

TABLE 1.—COMPONENTS USED IN MAKING UP SOLUTIONS A AND B (Examples 1-4)

| Components | Example No. | | | |
|---|---|---|---|---|
| | 1 | 2 | 3 | 4 |
| Solution A: | | | | |
| CaCl₂ (g.) | 274.6 | 274.6 | 274.6 | 274.6 |
| SrCO₃ (g.) | | 3.69 | 3.69 | 3.69 |
| CdCO₃ (g.) | | 4.31 | 4.31 | 4.31 |
| Mn(NO₃)₂ (g.) | | | 7.58 | |
| Sb₂O₃ (g.) | | | | 4.46 |
| Hydrochloric acid (ml. of 37% acid) | 30 | 36 | 41 | 41 |
| Solution B: | | | | |
| (NH₄)₂HPO₄ (g.) | 198.1 | 198.1 | 198.1 | 198.1 |
| NH₄F (g.) | 17.4 | 15.7 | 15.7 | 15.7 |
| NH₄OH (mols) | 1.75 | 1.97 | 1.86 | 1.86 |

TABLE 2.—POST PRECIPITATION ADDITIONS

| | Example No. | | | | |
|---|---|---|---|---|---|
| | 1 | | 2 | 3 | 4 |
| Additive | X | Y | | | X Y |
| Mn(NO₃)₂ (g.) | 4.37 | 7.58 | | 3.79 | |
| SbCl₃ solution | | | | | |
| Sb₂O₃ (g.) | | 1.82 | 5.46 | 5.46 | |
| Hydrochloric acid (ml. of 37% HCl) | 5 | 15 | | 15 | |
| NH₄Cl (g.) | 10 | Sat'd | | (²) | |
| Total volume (ml.) | 25 | 100 | | 65 | |
| | (¹) | (¹) | (¹) | | |

¹ Slurry stirred 15 minutes before filtration.
² 50 ml. of saturated NH₄Cl solution.

EXAMPLE 2

Solution A

A clear acidic solution of cations desired in an apatite-type phosphor was prepared by dissolving the following compounds in a solution of hydrochloric acid (containing 41 ml. of 37% acid) and diluting the resulting clear solution with water to a total volume of one liter:

| | G. |
|---|---|
| CaCl₂ | 260.9 |
| SrCO₃ | 3.69 |
| CdCO₃ | 4.31 |
| Mn(NO₃)₂ (in the form of a 58% solution) | 7.58 |
| Sb₂O₃ | 5.19 |

SOLUTION B

Diammonium hydrogen phosphate (198.1 g.) was dissolved in dilute ammonia solution (1.77 moles NH₄OH) and the resulting solution was diluted with water to a total volume of two liters.

Initial precipitation

Solutions A and B were simultaneously added, at rates of approximately 100 ml./min. and 200 ml./min., respectively, into a precipitation vessel containing about 500 ml. of water, well stirred. At the end of the precipitation the slurry was neutral to slightly alkaline (pH 7-8).

Further treatment

One liter of a solution of ammonium fluoride (7.44 g. NH₄F) was added at a rate of about 100 ml./min. to one-half of the slurry prepared as described in the preceding paragraph. The resulting slurry was filtered and the precipitate was washed, dried and ground as described in the previous examples.

EXAMPLE 6

Solution A

A clear acidic solution was prepared by dissolving the quantities of calcium chloride, strontium carbonate and cadmium carbonate shown in Example 5 in a solution of hydrochloric acid (containing 26 ml. of 37% acid) and diluting the resulting clear solution with water to a total volume of one liter.

Solution B

A solution of ammonium phosphate was prepared as described in Example 5.

Initial precipitation

This step was carried out as described in Example 5.

Further treatment

Following completion of the initial precipitation solutions of manganese nitrate [58% solution containing 7.58 g. Mn(NO₃)₂] and antimony trichloride/ammonium chloride (5.19 g. Sb₂O₃ and 15 g. NH₄Cl dissolved in 50 ml. of solution containing 15 ml. of 37% hydrochloric acid) were added to the slurry. One liter of a solution of ammonium fluoride (14.88 g. NH₄F) was then added at a rate of about 100 ml./min. to the slurry resulting from the previous steps. The final slurry was filtered and the precipitate was washed, dried and ground as described in the previous examples.

EXAMPLE 7

A solution of ammonium fluoride (14.88 g. NH₄F in 500 ml. water) was added slowly to a well stirred acid solution of bivalent metal chlorides (prepared by dissolving 260.9 g. CaCl₂, 3.69 g. SrCO₃, and 4.31 g. CdCO₃, in a solution of 41 ml. of 37% hydrochloric acid diluted to 800 ml.). In this strongly acid slurry were dissolved manganese nitrate [7.58 g. Mn(NO₃)₂ as a 58% solution] and antimony trioxide (5.19 g.). Following addition of the activators a solution of ammonium phosphate [198.1 g. (NH₄)₂HPO₄, 1.77 moles NH₄OH in a total volume of 2000 ml.] was added at about 100 ml./min. The resulting product was filtered, washed, dried and ground as indicated in the previous examples.

EXAMPLE 8

Portions of the dried, powdered products of Examples 1-7 were placed in quartz vessels, heated to 1050° C. during a period of 90 minutes, then held at that temperature for an additional period (15 minutes for Examples 1-4; 30 minutes for Examples 5-7). The products of Examples 1X and 1Y were fired in covered crucibles; the other products were fired in boats in a quartz tube in a slow stream of nitrogen. The fired products were slightly sintered but easily crushed to a powder.

Chemical analyses of certain of the unfired products of Examples 1-7 and of certain of the fired products of Example 8 are set forth in Table 3. The fired products are identified by the letter F following the appropriate example designations of the unfired intermediates.

TABLE 3.—CHEMICAL COMPOSITION OF UNFIRED AND FIRED APATITE-TYPE HALOPHOSPHATES

[Expressed in terms of atomic/ionic proportions of halide and meta ions/6 mols PO₄]

| Example No. | Gram-atoms | | | | | | | Mols PO₄ |
|---|---|---|---|---|---|---|---|---|
| | Ca | Sr | Cd | Mn | Sb | Cl | F | |
| 2X | 9.09 | 0.10 | 0.07 | 0.16 | 0.13 | 2.21 | 1.67 | 6.00 |
| 2XF | 9.26 | 0.10 | 0.07 | 0.16 | 0.07 | 0.07 | 1.63 | 6.00 |
| 5 | 8.81 | 0.095 | 0.090 | 0.14 | 0.13 | 0.48 | 1.52 | 6.00 |
| 5F | 8.92 | 0.094 | 0.087 | 0.14 | 0.07 | 0.06 | 1.57 | 6.00 |

The dried, unfired products of Examples 1-7 were irradiated by short wavelength U.V. light (2537 A.) from a mercury vapor lamp. With the exception of product 1X (unactivated), each fluoresced distinctly under such irradiation.

The crystal structure of the unfired products was examined by X-ray diffraction. The diffraction pattern of each contained lines characteristic of the apatite crystal structure, the breadths of the lines indicating that the crystallites were very small.

The X-ray diffraction patterns of the fired products correspond to that of well crystallized calcium fluoroapatite (ASTM pattern 15-876). Expected small deviations in the unit cell dimensions are observed, the deviations being due to substitution by the various cation or anion additives in the crystal latice. Small proportions of secondary phases, such as $Ca_2P_2O_7$ are indicated.

A semi-quantitative comparison of the luminous output of the halophosphate phosphors of Example 8 under 2537 A. irradiation with that of a commercial "cool white" phosphor was obtained by means of the Spectra Brightness Spot Meter (Photo Research Corp., Hollywood, Calif.). This is a filter photometer whose response to "white" light may be adjusted to approximate that of the human eye. Such photometer readings are shown in column A of Table 4. The readings shown in columns B and C of Table 4 are readings made, respectively, with red and blue filters, indicating the relative intensities of the red and blue components of the light emitted by the phosphors. Higher readings indicate higher luminous output.

TABLE 4

| Phosphor | A (Eye response filter) | B Red filter | C Blue filter |
|---|---|---|---|
| Commercial cool white | 80 | 48 | 42 |
| 1YF | 59 | 32 | 31 |
| 2XF | 77 | 43 | 42 |
| 2YF | 77 | 44 | 41 |
| 3F | 79 | 46 | 41 |
| 4XF | 80 | 46 | 44 |
| 4YF | 52 | 14 | 88 |
| 5F | 82 | 48 | 42 |
| 6F | 80 | 48 | 43 |
| 7F | 80 | 44 | 46 |

In view of the above, it will be seen that the several objects of the invention are achieved and other advantageous results attained.

As many changes could be made in the above methods and products without departing from the scope of the invention, it is intended that all matter contained in the above description shall be interpreted as illustrative and not in a limiting sense.

What is claimed is:

1. A process for preparing an alkaline earth halophosphate phosphor activated with antimony which comprises simultaneously adding to a stirred precipitation medium containing water a first reactant solution containing alkaline earth metal ions and a second reactant solution containing phosphate ions, halide ions being present in at least one of said first and second reactant solutions, said solutions being added in approximately stoichiometric proportions and intereacting to form a precipitate of an alkaline earth halophosphate having an apatite type structure, and thereafter digesting the resulting precipitate with a third solution containing antimony ions to form an alkaline earth halophosphate phosphor having antimony incorporated therein as an activator.

2. A process as defined by claim 1 wherein the reaction mixture of said first and second reactant solutions is maintained at a pH of about 6 to 8.

3. A process as defined by claim 1 wherein said first reactant solution contains calcium chloride and said second reactant solution contains diammonium hydrogen phosphate and ammonium fluoride.

References Cited

UNITED STATES PATENTS 2,476,654  7/1949  Froelich _____ 252—301.4P

FOREIGN PATENTS 717,653  10/1954  Great Britain _____ 252—301.4P

ROBERT D. EDMONDS, Primary Examiner